United States Patent [19]
Nakabo

[11] Patent Number: 5,623,640
[45] Date of Patent: Apr. 22, 1997

[54] DATA MEMORY SYSTEM THAT EXCHANGES DATA IN DATA LOCATIONS WITH OTHER DATA LOCATIONS BASED ON THE NUMBER OF WRITES TO THE MEMORY

[75] Inventor: Takeshi Nakabo, Kanagawa, Japan

[73] Assignee: NEC Corporation, Tokyo, Japan

[21] Appl. No.: 207,153

[22] Filed: Mar. 8, 1994

[30] Foreign Application Priority Data

Mar. 8, 1993  [JP]  Japan ................................. 5-46199

[51] Int. Cl.$^6$ ............................................. G06F 12/02
[52] U.S. Cl. ................ 395/497.01; 395/492; 395/489; 395/182.03; 395/182.04; 365/200; 364/DIG. 1
[58] Field of Search .......................... 370/59; 365/200; 395/489, 182.03, 182.04, 492, 497.01; 364/DIG. 1

[56] References Cited

U.S. PATENT DOCUMENTS 4,989,181  1/1991  Harada ........................... 365/200

5,136,579  8/1992  Nguyen ............................. 370/59

*Primary Examiner*—Tod R. Swann
*Assistant Examiner*—J. Peikari
*Attorney, Agent, or Firm*—Foley & Lardner

[57] ABSTRACT

A data memory system comprising a memory including a plurality of memory locations from which a stored data is readable and to which data is writable, an address latch for receiving and holding from an external device a relative address designating a memory location to be accessed, and an address decoder for designating an absolute address of a memory location of the plurality of memory locations on the basis of the relative address held in the address latch. This designated memory location is called an "m"th memory location. An address translation unit is controlled to change the "m"th memory location designated by the relative address to an "n"th memory location which is different from the "m"th memory location, where "m" and "n" are positive integers, based on the number of writes to the memory and the existence of coincident data in the "m"th and "n"th memory locations.

7 Claims, 6 Drawing Sheets

| NUMBER OF WRITINGS | WRITE COUNTER |
|---|---|
| 1 | 1H |
| 2 | 2H |
| 3 | 3H |
| 15 | FH |
| 16 | 0H |
| 17 | 1H |
| 18 | 2H |

20

21 OVERFLOW OF WRITE COUNTER

FIGURE 4

30 ADDRESS TRANSLATION TABLE BEFORE ABSOLUTE ADDRESS EXCHANGE

| RELATIVE ADDRESS | ABSOLUTE ADDRESS | INTERNAL DATA |
|---|---|---|
| 00H | 00H | 20H |
| 01H | 01H | 01H |
| 02H | 02H | 88H |
| 03H | 03H | 57H |
| 04H | 04H | D5H |
| 05H | 05H | 01H |
| 06H | 06H | C7H |
| 07H | 07H | 41H |

33 ADDRESS TO BE WRITTEN

32 ABSOLUTE ADDRESS EXCHANGE

31 ADDRESS TRANSLATION TABLE AFTER ABSOLUTE ADDRESS EXCHANGE

| RELATIVE ADDRESS | ABSOLUTE ADDRESS | INTERNAL DATA |
|---|---|---|
| 00H | 00H | 20H |
| 01H | 05H | 01H |
| 02H | 02H | 88H |
| 03H | 03H | 57H |
| 04H | 04H | D5H |
| 05H | 01H | 01H |
| 06H | 06H | C7H |
| 07H | 07H | 41H |

50 ADDRESS TRANSLATION TABLE BEFORE ABSOLUTE ADDRESS EXCHANGE

ADDRESS TO BE WRITTEN 53

| RELATIVE ADDRESS | ABSOLUTE ADDRESS | INTERNAL DATA |
|---|---|---|
| 00H | 00H | 20H |
| 01H | 01H | 01H |
| 02H | 02H | 88H |
| 03H | 03H | 57H |
| 04H | 04H | D5H |
| 05H | 05H | 01H |
| 06H | 06H | C7H |
| 07H | 07H | 41H |

54 ADDRESS EXCHANGE RANGE

⬇ 52 ABSOLUTE ADDRESS EXCHANGE

51 ADDRESS TRANSLATION TABLE AFTER ABSOLUTE ADDRESS EXCHANGE

| RELATIVE ADDRESS | ABSOLUTE ADDRESS | INTERNAL DATA |
|---|---|---|
| 00H | 00H | 20H |
| 01H | 01H | 01H |
| 02H | 02H | 88H |
| 03H | 03H | 57H |
| 04H | 04H | D5H |
| 05H | 05H | 01H |
| 06H | 06H | C7H |
| 07H | 07H | 41H |

55 ADDRESS EXCHANGE RANGE

DATA MEMORY SYSTEM THAT EXCHANGES DATA IN DATA LOCATIONS WITH OTHER DATA LOCATIONS BASED ON THE NUMBER OF WRITES TO THE MEMORY

BACKGROUND OF THE INVENTION

1. Field of the Invention

The present invention relates to a data memory system, and more specifically to a circuit for elevating reliability of a data memory system.

2. Description of Related Art

At present, a data memory is widely used in various office instruments, such as a word processor and a telecopier, and in various domestic instruments, such as a television receiver and an audio system, as a means for holding information such as a selected channel or frequency and a sound volume in the television receiver, which has to be maintained although an electric power is shut down.

Figure 1:
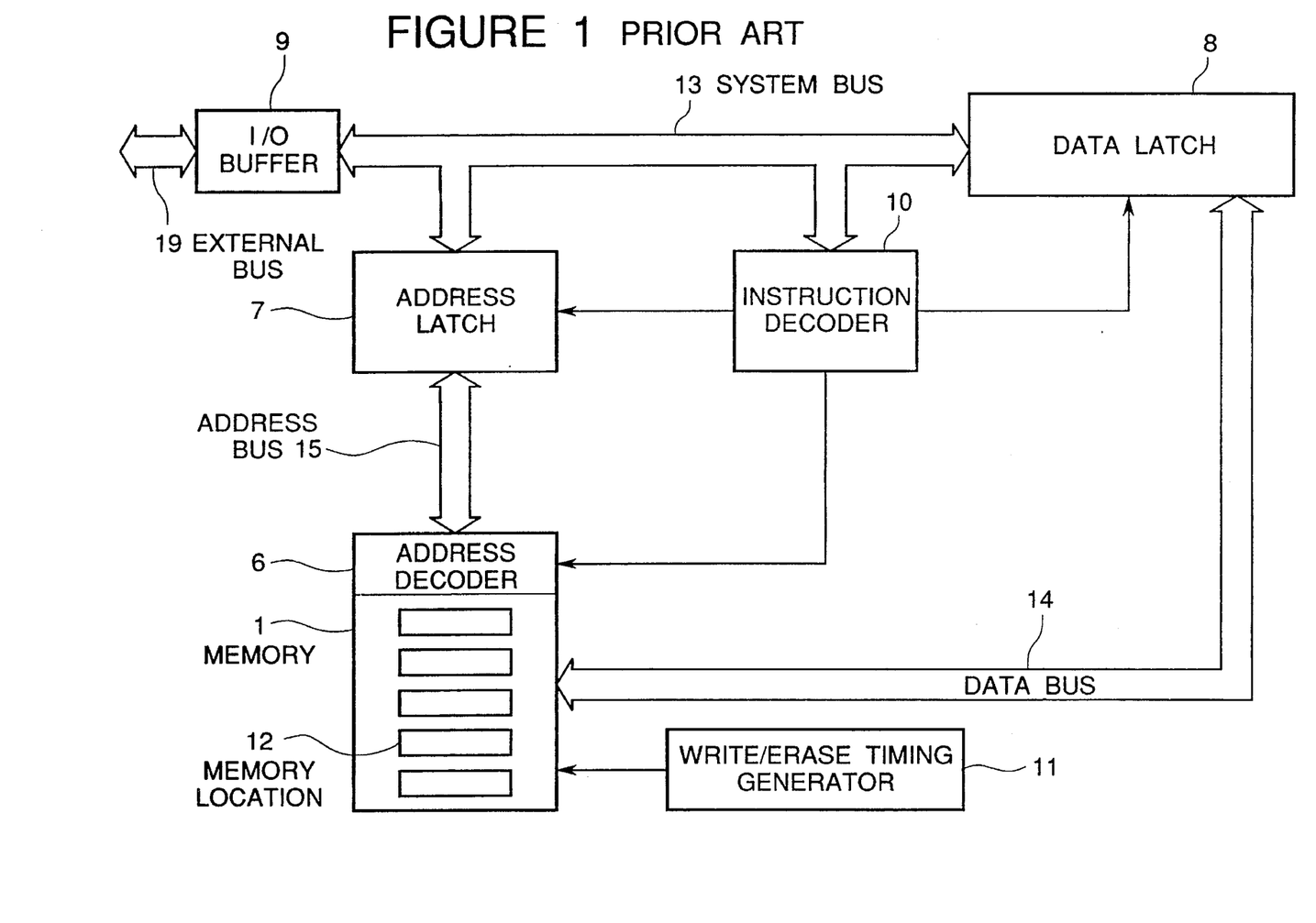
FIG. 1 is a block diagram illustrating a construction of a typical example of the conventional data memory system of the EEPROM type.

Referring to FIG. 1, there is shown is a block diagram illustrating a construction of an EEPROM (electrically erasable programmable read only memory), which is a typical example of the conventional data memory system, and which is disclosed in NEC Data Sheet IC-6053 of NEC Corporation. As shown in FIG. 1, this typical conventional memory data system comprises a memory 1 including a plurality of memory locations 12, an I/O (input/output) buffer 9 coupled to an external bus 19 for interfacing to an external device, an address latch 7 coupled through a system bus 13 to the I/O buffer 9 for latching an address fetched through the I/O buffer 9, an address decoder 6 coupled through an address bus 15 to the address latch 7 and associated to the memory 1 for selecting a memory location designated by the address latched in the address latch 7, a data latch 8 coupled to the system bus 13 and also to the memory 1 through a data bus 14 for holding data read from or to be written to the selected memory location 12, an instruction decoder 10 coupled to the system bus 13 to receive an instruction given through the I/O buffer 9 from the external device for analyzing the given instructions and for controlling the address latch 7, the address decoder 6 and the data latch 8, and a write/read timing generator 11 for supplying a timing signal to the memory 11.

Thus, data supplied through the I/O buffer 9 from the external device is analyzed by the instruction decoder 10. If it is discriminated that the given data is an address, the given data, namely, the given address, is set to the address latch 7 under control of the instruction decoder 10. On the basis of the address latched in the address latch 7, the address decoder 6 selects one memory location within the memory 1. A data writing or reading is performed for the selected memory location by means of the data latch 8.

In general, the addresses to be read and written of the memory system are determined when an instrument incorporating therein the data memory system is designed, and thereafter, the addresses are never changed.

In the above mentioned conventional data memory system, therefore, if the address designated from the external device is the same, a read/write is performed on the same memory region. Therefore, the number of writings varies from one memory location to another. On the other hand, the lifetime of the entire data memory system is determined by the memory location having a maximum number of writings performed. Accordingly, memory regions having a small number of writings performed becomes wasteful. This is not efficient.

SUMMARY OF THE INVENTION

Accordingly, it is an object of the present invention to provide a data memory which has overcome the above mentioned defect of the conventional one.

Another object of the present invention is to provide a data memory configured so that a memory location having a larger number of writings is never localized or concentrated in a special region, namely, the number of writings is balanced over the whole of memory locations, with the result that the lifetime and reliability of the data memory system are increased.

The above and other objects of the present invention are achieved in accordance with the present invention by a data memory system comprising a memory including a plurality of memory regions from which a stored data is readable and to which data is writable, an input means for receiving and holding from an external device a first region designation information designating a memory region to be accessed, a selection means for designating, on the basis of the first region designation information held in the input means, a memory region of the plurality of memory regions, this designated memory region being called an "m"th memory location, and a region changing means for changing the "m"th memory region designated by the first region designation information to an "n"th memory region which is different from the "m"th memory region, where "m" and "n" are positive integers.

In a preferred embodiment, the data memory system further includes a retrieving means for retrieving the "n"th memory region in which the same information as the information written in the "m"th memory region is stored, and means for changing the memory region selected by a second region designation information designating the "n"th memory region retrieved by the retrieving means, from the "n"th memory region to the "m"th memory region, and also for changing the memory region selected by the first region designation information, from the "m"th memory region to the "n"th memory region.

More preferably, the data memory system includes a count means for counting the number of writings performed to the "n"th memory region.

The above and other objects, features and advantages of the present invention will be apparent from the following description of preferred embodiments of the invention with reference to the accompanying drawings.

DESCRIPTION OF THE PREFERRED EMBODIMENTS

Figure 2:
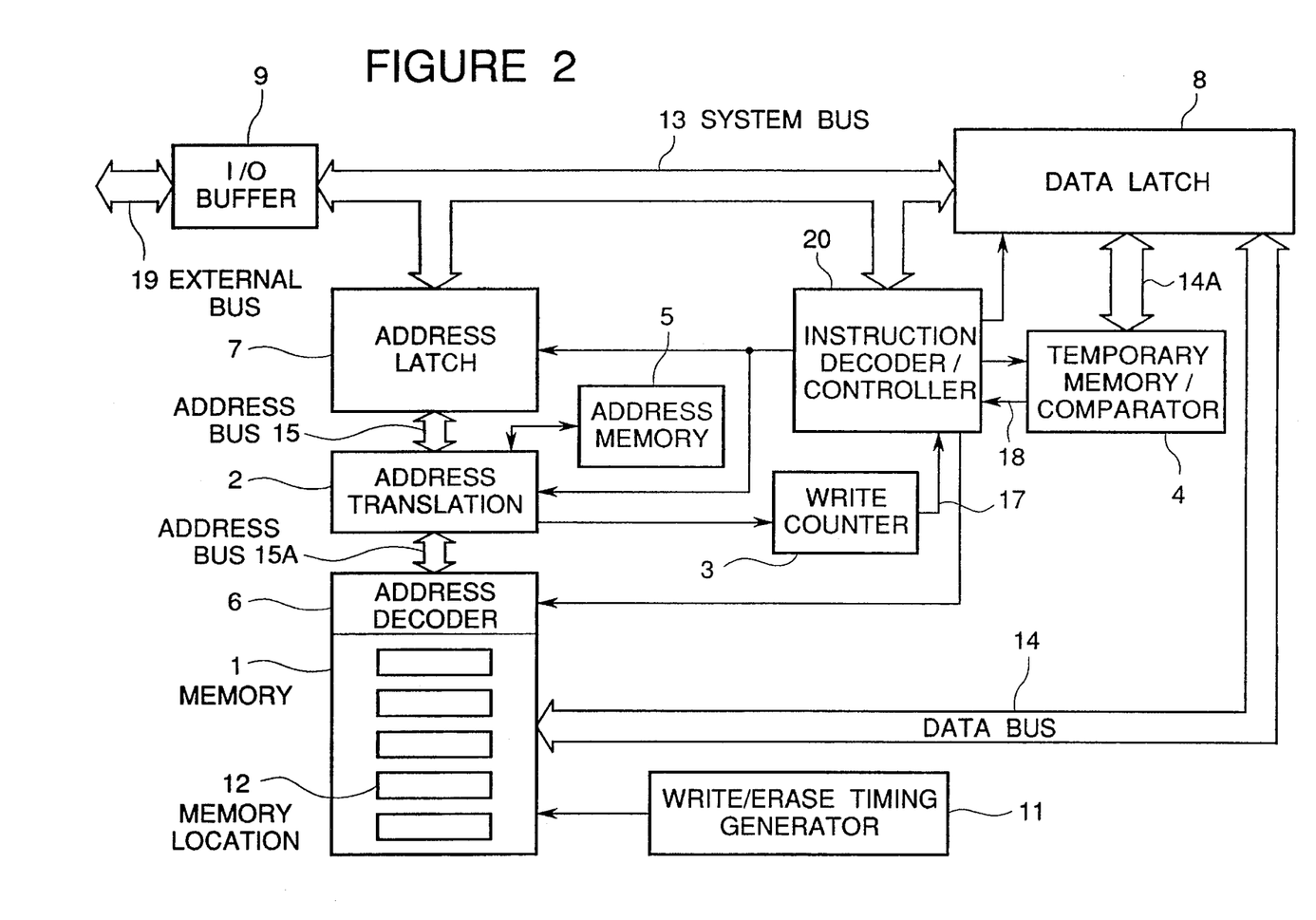
FIG. 2 is a block diagram illustrating a construction of a first embodiment of the data memory system of the EEPROM type in accordance with the present invention.

Referring to FIG. 2, there is shown a block diagram illustrating a construction of a first embodiment of the data memory system of the EEPROM type in accordance with the present invention. In FIG. 2, elements corresponding or similar to those shown in FIG. 1 are given the same Reference Numerals, and explanation thereof will be omitted for simplification of description.

The memory 1 is of the EEPROM type. As will be apparent from comparison between FIGS. 1 and 2, the shown embodiment includes an address translation unit 2 for translating a relative address to an absolute address. This address translation unit 2 has an input coupled to the address latch 7 through the address bus 15 and an output coupled to the address decoder 6 through an address bus 15A. The shown embodiment further includes a write counter 3 connected to the address translation unit 2 for counting the number of writings, a temporary memory/comparator 4 coupled through a data bus 14A to the data latch 8 for temporarily storing data for comparison of data in a memory location at the time of the absolute address exchange and for performing the data comparison itself so as to generate a coincidence signal 18 to an instruction decoder/controller 20, and an address memory 5 coupled to the address translation unit 2 and used at the time of the absolute address exchange. When the write counter 3 overflows, an overflow signal is supplied from the write counter 3 to the instruction decoder/controller 20 as an absolute address exchange request signal 17. This instruction decoder/controller 20 is coupled to the system bus 13, similarly to the instruction decoder 10 shown in FIG. 1, but controls not only the address latch 7, the address decoder 6 and the data latch 8, but also the address translation unit 2 and the temporary memory/comparator 4.

Now, operation of the first embodiment will be explained.

In a reading operation, a read address is supplied through the I/O buffer 9 to the system bus 13, and it is discriminated by the instruction decoder/controller 20 that the data on the system bus 13 is a read address, so that the read address on the system bus 13 is set to or latched in the address latch 7 under control of the instruction decoder/controller 20. Then, the instruction decoder/controller 20 controls the address translation unit 2 so as to receive the read address (relative address) supplied from the external device and output an absolute address corresponding to the read address (relative address), to the address decoder 6. Thus, a content of a memory location designated by the address decoder 6 is outputted onto the data bus 14 and latched in the data latch 8.

Next, a writing operation of the first embodiment will be explained. In the writing operation, an address designation is performed similarly to the reading operation, and then, it is discriminated by the instruction decoder/controller 20 that the data on the system bus 13 is data to be written, so that the data to be written is latched in the data latch 8 and then is written to a designated memory location.

Figure 3:
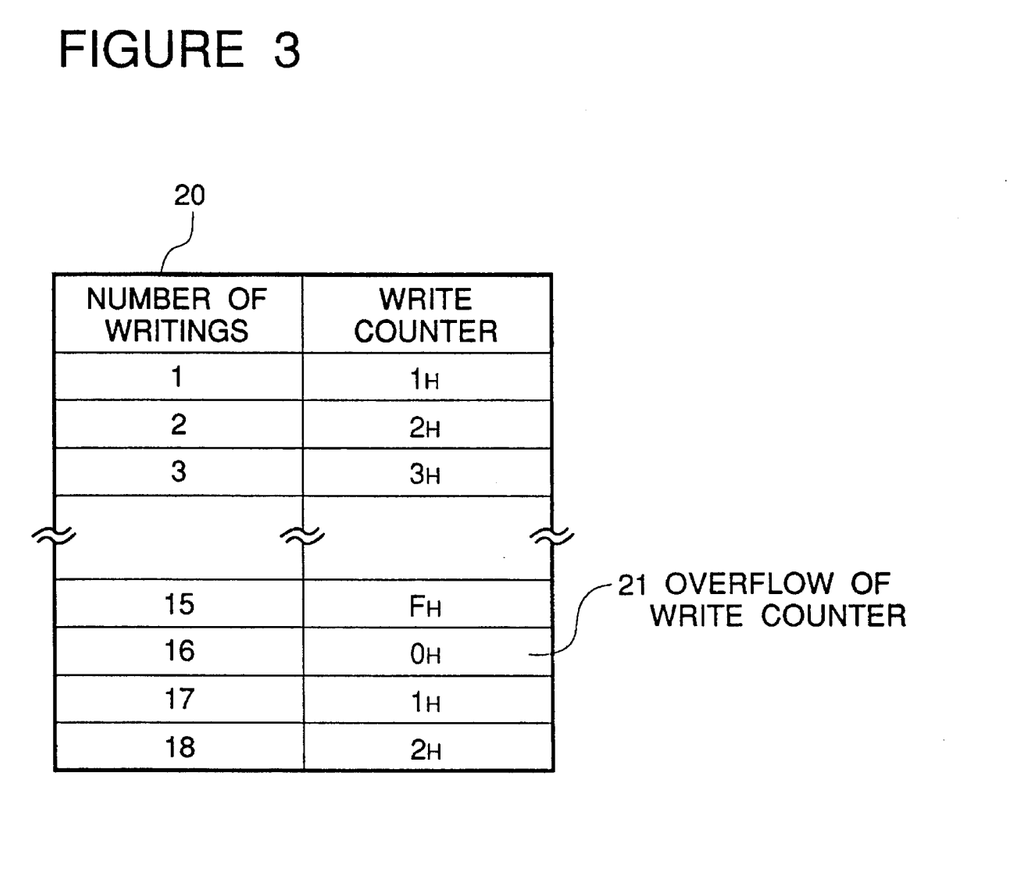
FIG. 3 is a table illustrating an operation of the write counter incorporated in the data memory system shown in FIG. 2.

Referring to FIG. 3, there is illustrated an example of the operation of the write counter 3. As shown in FIG. 3, at each time the writing is performed, the content of the write counter 3 is incremented by +1. Now, assuming that the write counter 3 is a four-bit counter, when the content of the write counter 3 is incremented by +1 from "$F_H$" (where the suffix "H" represents a hexadecimal notation), an overflow occurs in the write counter 3 as designated by Reference Numeral 21 in FIG. 3. As a result, the content of the write counter 3 returns to "$0_H$". When the overflow occurs in the write counter 3, the absolute address exchange request signal 17 is supplied to the instruction decoder/controller 20, so that the absolute address is rewritten as follows:

The instruction decoder/controller 20 controls the address latch 7 and the address translation unit 2 to the effect that the read address (relative address) supplied from the external device is supplied from the address latch 7 to the address translation unit 2, and the address translation unit 2 outputs an absolute address corresponding to the read address (relative address) to the address decoder 6, so that data is read out of the memory location or address to be now written with a new data, and the read-out data is stored in the temporary memory/comparator 4 through the data bus 14, the data latch 8 and the data bus 14A. Simultaneously, the absolute address from which the data has been now read out is stored in the address memory 5. Thereafter, data is consecutively read out of the memory 1 starting from a memory location (absolute address) next to the memory location (absolute address) from which the data has been now read out. At each time the data is read out, the temporary memory/comparator 4 compares the data latched in the data latch 8 with the data stored in the temporary memory/comparator 4 itself under control of the instruction decoder/controller 20. As a result, if two items of data compared with each other are the same, the temporary memory/comparator 4 outputs the coincidence signal 18 to the instruction decoder/controller 20, and the instruction decoder/controller 20 performs the absolute address exchange. However, if any two items of data compared with each other are not the same, the absolute address exchange is not performed.

Figure 4:
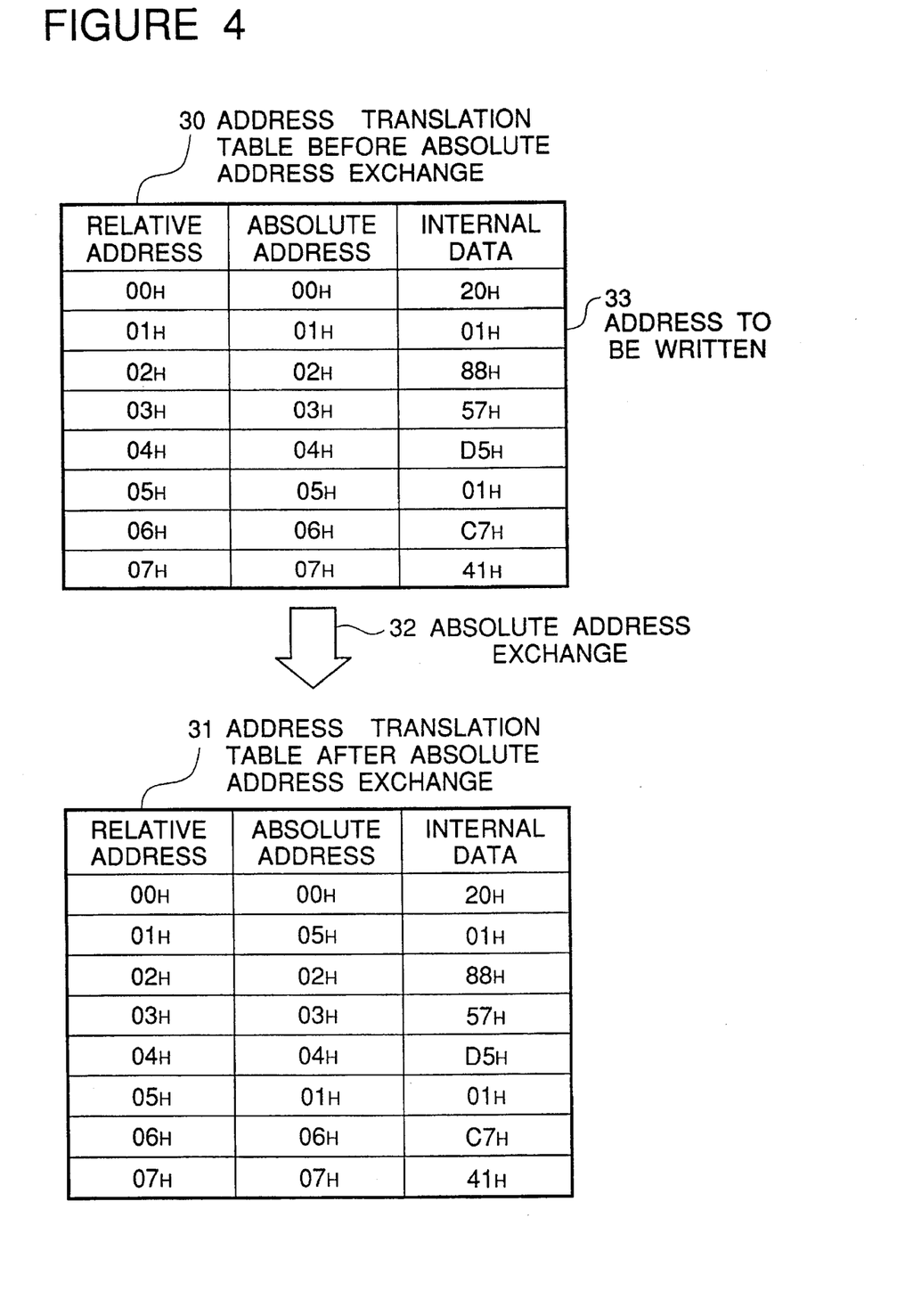
FIG. 4 illustrates an absolute address exchanging operation performed in the address translation unit shown in FIG. 2.

Referring to FIG. 4, there is illustrated an absolute address exchanging operation performed in the address translation unit 2 shown in FIG. 2.

A table 30 shown in an upper half of FIG. 4 illustrates the address translation table before the absolute address exchange. In this table 30, the data "$01_H$" stored in the relative address "$01_H$" and the absolute address "$01_H$" is the same as the data "$01_H$" stored in the relative address "$05_H$" and the absolute address "$05_H$". Therefore, the absolute address exchange 32 is performed. A table 31 shown in a lower half of FIG. 4 illustrates the address translation table after the absolute address exchange. In this table 31, the relative address "$01_H$" is translated to the absolute address "$05_H$", and the relative address "$05_H$" is translated to the absolute address "$01_H$".

This absolute address exchange can be performed under control of the instruction decoder/controller 20. Here, assuming that the absolute address stored in the address memory 5 is the absolute address "$01_H$", the instruction decoder/controller 20 rewrites the contents of the address translation unit 2 in such a manner that the absolute address "$05_H$" on the absolute address column in the row of the relative address "$05_H$" is moved and written to the absolute address column in the row of the relative address "$01_H$", and then, the absolute address "$01_H$" stored in the address memory 5 is written to the absolute address column in the row of the relative address "$05_H$".

In the above mentioned manner, the absolute address exchange is performed at each time a predetermined number of writings are performed. Therefore, the number of writings to the same absolute address can be decreased, and accordingly, the lifetime and the reliability of the data memory system are increased.

Figure 5:
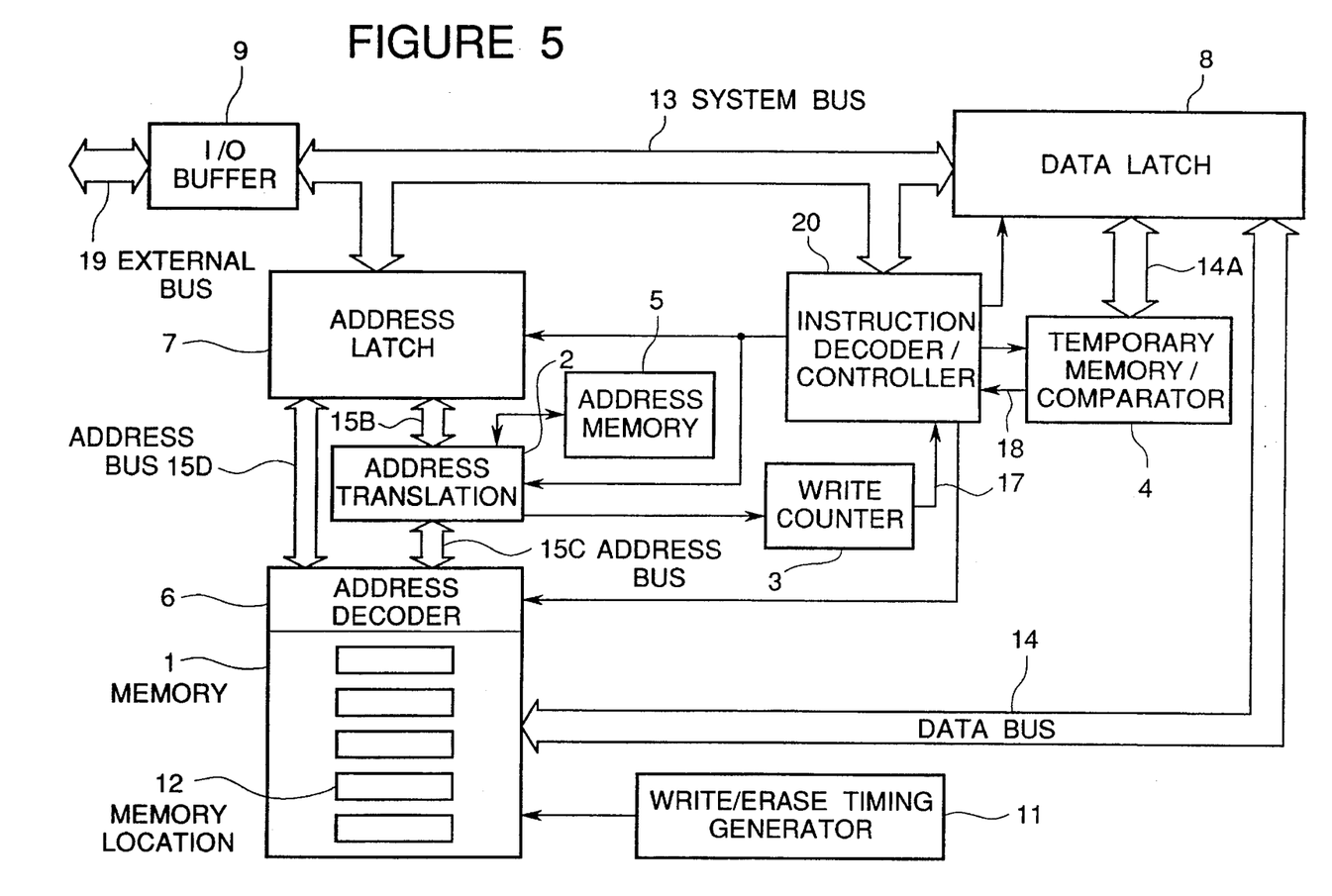
FIG. 5 is a block diagram illustrating a construction of a second embodiment of the data memory system of the EEPROM type in accordance with the present invention.

Referring to FIG. 5, there is shown a block diagram illustrating a construction of a second embodiment of the data memory system of the EEPROM type in accordance with the present invention. In FIG. 5, elements similar to those shown in FIG. 2 are given the same Reference Numerals, and explanation thereof will be omitted.

As will be apparent from comparison between FIGS. 2 and 5, the second embodiment is different from the first embodiment only in the address translation unit 2 and the connection between the address latch 7 and the address decoder 6 through the address translation unit 2. Namely, the address latch 7 is coupled through an address bus 15B to the address translation unit 2, whose output is coupled through an address bus 15C to the address decoder 6. Further, the address latch 7 is coupled through an address bus 15D to the address decoder 6 without intermediary of the address translation unit 2.

In the first embodiment, the address exchange is performed for the entire memory region, but in the second embodiment, the range for which the address exchange is performed is limited to only a restricted block. The method of the address exchange is the same as that of the first embodiment. However, the data retrieval for the absolute address exchange is performed only within an address exchange range, and if the same data is found, the absolute address exchange is perforated similarly to the first embodiment. If the same data cannot be found, the absolute address exchange is not performed.

Figure 6:
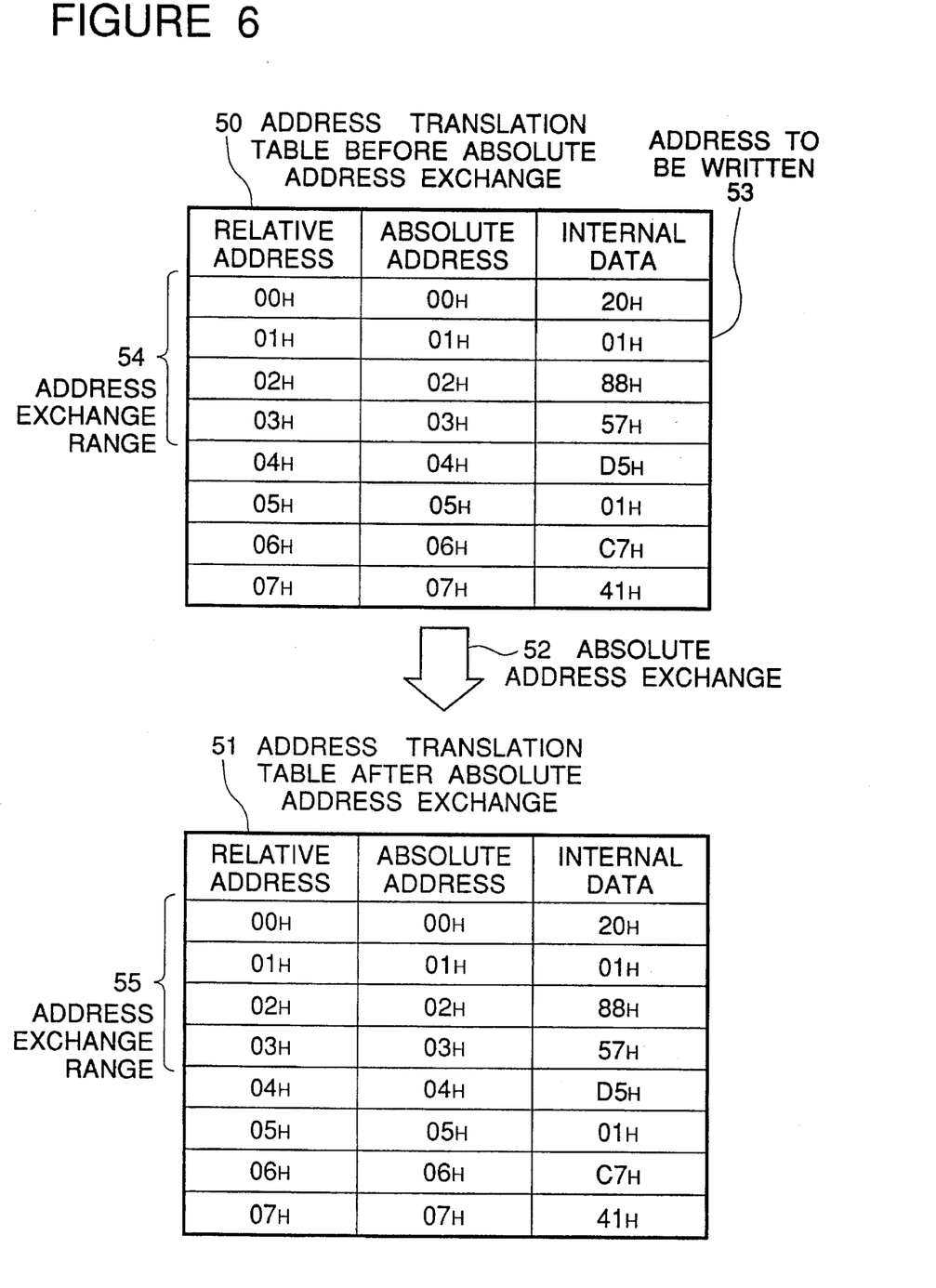
FIG. 6 illustrates an absolute address exchanging operation performed in the address translation unit shown in FIG. 5.

Referring to FIG. 6, there is illustrated an example in which the absolute address exchange is not performed in the address translation unit shown in FIG. 5. A table 50 shown in an upper half of FIG. 6 illustrates the address translation table before the absolute address exchange, in which the data "$01_H$" stored in the relative address "$01_H$" and the absolute address "$01_H$" is the same as the data "$01_H$" stored in the relative address "$05_H$" and the absolute address "$05_H$". However, since the relative address "$05_H$" is out of an address exchange range 54, the absolute address exchange 52 is not performed. Accordingly, the address translation table after the absolute address exchange, illustrated in a table 51 shown in a lower half of FIG. 6, is the same as the address translation table illustrated in the upper half of FIG. 6.

Returning to FIG. 5, for the address exchange range 54, the address latch 7 is coupled through the address translation unit 2 to the address decoder 6. For the memory address other than the address exchange range 54, the address latch 7 is coupled through an address bus 15D to the address decoder 6 without intermediary of the address translation unit 2.

As could be understood from the above description with reference to the drawings, even if the a large number of writings are performed for the same relative address, since the absolute address having a large number of writings performed is exchanged with the address address having a small number of writings performed, it is possible to reduce the number of writings performed to the same absolute address. Therefore, the absolute address exchange makes it possible to utilize a memory location which was never used in the prior art. In other words, the number of writings performed to different absolutes address, namely, different memory locations, can be equalized. Accordingly, the lifetime and the reliability of the data memory system can be remarkably increased.

The invention has thus been shown and described with reference to the specific embodiments. However, it should be noted that the present invention is in no way limited to the details of the illustrated structures but changes and modifications may be made within the scope of the appended claims.

I claim:

1. A data memory system comprising:

a memory including a plurality of memory locations from which stored data is readable and to which data is writable;

an input means for receiving and holding a memory location designation information designating a memory location to be accessed within said memory;

a selection means receiving said memory location designation information held in said input means, for designating, from said plurality of memory locations, an "m"th memory location when said selection means receives a first memory location designation information designating said "m"th memory location, and an "n"th memory location which is different from said "m"th memory location, and which stores the same data as that stored in said "m"th memory location, when said selection means receives a second memory location designation information designating said "n"th memory location, where "m" and "n" are positive integers different from each other;

a count means for counting a number of writings performed to said "m"th memory location; and a region exchanging means coupled to said selection means and said count means, for controlling said selection means when a count value of said count means reaches a predetermined value, to cause said selection means to designate said "n"th memory location when said selection means receives said first memory location designation information designating said "m"th memory location, and for designating said "m"th memory location when said selection means receives said second memory location designation information designating said "n"th memory location.

2. A data memory system claimed in claim 1, wherein said region exchanging means includes a retrieving means for retrieving data from said "n"th memory location which stores the same data as that stored in said "m"th memory location, when said count value of said count means reaches said predetermined value, so that when said count value of said count means reaches said predetermined value, said region exchanging means causes said selection means to designate said "n"th memory location when said selection means receives said first memory location designation information designating said "m"th memory location, and to designate said "m"th memory location when said selection means receives said second memory location designation information designating said "n"th memory location.

3. A data memory system comprising:

a memory of an EEPROM type, said memory including a plurality of memory locations from which stored data is readable and to which data is writable;

an input means for receiving and holding a memory location designation information designating a memory location to be accessed within said memory;

a selection means receiving said memory location designation information held in said input means, for designating, from said plurality of memory locations, an "m"th memory location in accordance with said received memory location designation information, where "m" is a positive integer;

a count means for counting a number of writings performed to said "m"th memory location;

a retrieving means for retrieving data from an "n"th memory location storing the same data as that stored in said "m"th memory location, when a count value of said count means reaches a predetermined value, where "n" is a positive integer different from "m", said "n"th memory location being different from said "m"th memory location within said memory; and a region exchanging means coupled to said selection means, said count means and said retrieving means, for controlling said selection means when said count value of said count means reaches said predetermined value, to cause said selection means to designate said "n"th memory location retrieved by said retrieving means when said selection means receives said first memory designation information designating said "m"th memory location, and for designating said "m"th memory location when said selection means receives said second memory designation information designating said "n"th memory location, whereby the number of writings is balanced over all of the plurality of memory locations of said memory.

4. A data memory system claimed in claim 3, further comprising:

an input/output buffer coupled to an external bus for interfacing to an external device;

a data latch coupled through a system bus to said input/output buffer and through a data bus to said memory, for latching data to be written into said memory, from said input/output buffer, and data read out from said memory, to be outputted to said input/output buffer; and an address decoder associated with said memory, wherein said input means includes an address latch coupled through said system bus to said input/output buffer for latching a relative address through said input/output buffer, wherein said selection means includes an address translation unit having an input coupled to said address latch, and including an address translation table for translating said relative address held in said address latch to an absolute address, which is supplied to said address decoder, wherein said counting means includes a write counter connected to said address translation unit, for counting the number of writings and for generating an absolute address exchange request signal when the number of writings performed at a first absolute address corresponding to said "m"th memory location reaches said predetermined number, said first absolute address corresponding to a first relative address, wherein said retrieving means includes an address memory coupled to said address translation unit, and a temporary memory/comparator coupled to said data latch, and wherein said region exchanging means includes an instruction decoder/controller coupled to said system bus and responsive to said absolute address request signal, for controlling said address latch, said address translation unit, said data latch, said address decoder and said temporary memory/comparator in such a manner that the relative address is supplied from said address latch to said address translation unit, said address translation unit then outputs said first absolute address corresponding to said relative address to said address decoder, so that data is read from said first absolute address to be now written with new data, and the read-out data is stored in said temporary memory/comparator through said data bus and said data latch, and simultaneously, said first absolute address from which the data has been read out is stored in said address memory, and thereafter, data is consecutively read out of said memory starting from an absolute address next to said first absolute address, and then, at each time data is read out, said temporary memory/comparator compares the data latched in said data latch with the data stored in said temporary memory/comparator, and if two items of data compared with each other are the same, said temporary memory/comparator outputs a coincidence signal to said instruction decoder/controller, said instruction decoder/controller then performs an absolute address exchange by rewriting said address translation table.

5. A data memory system claimed in claim 4, wherein, when said instruction decoder/controller performs the absolute address exchange, in a case where a second absolute address corresponding to said "n"th memory location stores data that is the same as the data stored in said temporary memory/comparator, and which corresponds to a second relative address, if said first relative address is supplied to said address translation unit, said second absolute address is supplied to said address decoder, and if said second relative address is supplied to said address translation unit, said first absolute address is supplied to said address decoder.

6. A method of exchanging data stored in one of a plurality of memory locations of a memory to another of the plurality of memory locations, the method comprising the steps of:

a) counting a number of writings to each memory location of the memory;

b) for each write to the memory, performing an address translation from a relative address of a memory write request to the memory to an absolute address corresponding to a particular memory location of the memory;

c) for each write to the memory, determining if the number of writings to a memory location having an absolute address corresponding to a relative address of a current write request to the memory exceeds a first value;

d) if the number of writings in the step c) exceeds the first value, storing the data to be written out of the memory based on the current write request to a temporary data memory, and simultaneously storing an absolute address of the data to be written out of the memory in an address memory;

e) thereafter, reading data out of the memory starting from a memory location having an absolute address that is consecutive in number from the absolute address of the data written out of the memory in the step d);

f) each time the data is read out of the memory in the step e), comparing the read-out data with the data stored in the temporary data memory; and g) if there is a data coincidence in the step f), performing an absolute address exchange by replacing the absolute address of the data written out of the memory in the step d) with an absolute address of the read-out data in the step f) that caused the coincidence.

7. A method claimed in claim 6, further comprising the step of resetting a value corresponding to the number of writings back to zero after the step g) when the number of writings exceeds the first value.

* * * * *